United States Patent

[11] 3,579,196

[72] Inventors Roland S. Gregg, Jr.;
Arnold S. Danberg; Kenneth N. Larson,
Canoga Park, Calif.

[21] Appl. No. 799,274
[22] Filed Feb. 14, 1969
[45] Patented May 18, 1971
[73] Assignee The Bunker-Ramo Corporation
Canoga Park, Calif.

[54] DATA STORAGE AND DISPLAY SYSTEM
14 Claims, 7 Drawing Figs.

[52] U.S. Cl. .......... 340/172.5
[51] Int. Cl. .......... G11b 13/00
[50] Field of Search .......... 340/172.5; 235/157

[56] References Cited

UNITED STATES PATENTS

| | | | |
|---|---|---|---|
| 3,037,192 | 5/1962 | Everett | 340/172.5 |
| 3,346,853 | 10/1967 | Koster et al. | 340/172.5 |
| 3,399,401 | 8/1968 | Ellis et al. | 340/172.5X |
| 3,487,371 | 12/1969 | Frank | 340/172.5 |

OTHER REFERENCES

IBM 2250 Display Unit Model 2 and IBM 2840 Display Control Model 1 Publication Form A27-2702-0 (1966) pp. 7—13

*Primary Examiner*—Paul J. Henon
*Assistant Examiner*—R. F. Chapuran
*Attorneys*—Nathan Cass, Ronald J. Kransdorf and Lindenberg and Freilich

ABSTRACT: A data storage and display system is provided with a control feature for selectively displaying stored message formats having fields into which data is to be entered by an operator. The feature includes means for insuring that the data entered into each field is of the numeric or alphabetic type if either has been specified on a character-by-character basis. If the operator attempts to enter any other type of character for a given specified character, an error is indicated and a correct character must be entered before proceeding to the next character in the same or different field. There is also provision for determining whether entries in all fields have been completed before the message format can be transferred to a file storage and control unit.

*INVENTORS*
ROLAND S. GREGG, JR.
ARNOLD S. DANBERG
KENNETH N. LARSON

BY [signature]
ATTORNEYS

INVENTORS
ROLAND S. GREGG, JR.
ARNOLD S. DANBERG
KENNETH N. LARSON

BY Lindenberg & Freilich
ATTORNEYS

INVENTORS
ROLAND S. GREGG, JR.
ARNOLD S. DANBERG
KENNETH N. LARSON

Lindenberg & Freilich
ATTORNEYS

*INVENTORS*
ROLAND S. GREGG, JR.
ARNOLD S. DANBERG
KENNETH N. LARSON
BY
Lindenberg & Freilich
ATTORNEYS

DATA STORAGE AND DISPLAY SYSTEM

BACKGROUND OF THE INVENTION

1. Field of the Invention

This invention relates generally to digital data storage and display systems and more particularly to such a system including a keyboard for enabling an operator to selectively display stored data, and both edit and enter new data.

2. Description of the Prior Art

Many storage and display systems are known in the prior art for facilitating data composition, either for file storage or transmission to external systems. Typically, these systems are comprised of a data storage device such as a magnetic drum, a keyboard for entering and editing data, and a display device, such as a cathode-ray tube (CRT), for displaying data being entered or edited, or for otherwise displaying selected data from the storage device, or from some external system. Appropriate control and transmission networks are provided with the storage device for these various operations.

Most such systems incorporate a variety of features intended to facilitate the operator's task of composing, editing, rearranging, and otherwise manipulating data while it is displayed. Thereafter, the displayed data is either placed in file storage or transmitted to an external system. For example, the system of U.S. Pat. No. 3,166,636 displays two separate messages and allows an operator to copy a selected line or word from one message into the other.

SUMMARY OF THE INVENTION

The present invention is directed to a data storage and display system for further facilitating an operator's task of entering and editing data.

More particularly, the present invention is primarily directed to a data display system in which a fixed message format is displayed in a manner to indicate to an operator the fields of the format to be completed and the nature of the data required for completion.

In accordance with an embodiment of the invention, a message format is displayed with fields to be completed by entry of characters of a specified type, such as numeric, alphabetic, or either one of the numeric and alphabetic types. Each character of the message format is displayed in accordance with a predetermined code, and each character position of a given field to be completed is designated by a control symbol which indicates the type of character to be entered. The code of each control symbol includes binary code bits in predetermined positions that specify the type of character to be entered, such as the binary code 01 for a numeric character, code 10 for an alphabetic character, and code 11 for either one of the numeric and alphabetic types. A keyboard system enables an operator to enter characters in a field one character at a time, but before a character is entered by substitution for a control symbol, a comparison is made between the type of character being entered and the type of character specified by the control symbol. If the comparison test fails, an error is indicated and the character is not entered. To accomplish that, first means decodes the video code of the new character to be displayed and generates a type code. Second means then compares the new character type code with the type code of the control symbol in the position where the new character is being entered. If the test fails an error flip-flop is set.

In accordance with a further feature of the invention, an error also prevents the operator from going on to the next character position of a field, or onto another field, until a correct character has been entered. To accomplish that, the operator must reset the error flip-flop and actuate a different character key. The error flip-flop may be reset automatically upon any key being actuated, but for format control it is preferred that the flip-flop be manually reset by actuation of a separate key.

In accordance with still another feature of the invention, the message format being displayed is stored in a special storage unit and can not be returned to a file storage and control unit for storage or transmission to an external system until all fields have been completed by the entry of the appropriate characters for each control symbol thereof. That is accomplished by monitoring each character of the entire message, or any line thereof, as it is being transferred, and terminating the operation if it is detected that any control symbol is still present in the message. To accomplish that, an error flip-flop is set upon a control symbol being detected. The flip-flop then terminates further transfer of message characters and signals to the control network of an output buffer in the file storage and control unit that the transfer operation has been terminated. The flip-flop must then be reset by the operator and transfer of the message format reinitiated after all entries in the message format have been properly made.

In accordance with another significant feature of the present invention, each of the characters, including control symbols, of a message format is displayed on a CRT display device in a 5×7 dot matrix. Each of the five columns of the matrix constitutes one stroke of the CRT. Seven bit times are required for one stroke, and one bit time for return of the beam to the base of the line of characters for the next stroke. Binary digits are read from a recirculating memory and applied in series to the beam blanking control system of the CRT during the first five strokes of a character, seven digits during each stroke and an eighth digit during return of the beam for the next stroke. Since the beam is blanked during the eighth bit time of each stroke, a binary digit of nonvideo data may be stored in the eighth bit position of each character stroke so that as the video data is cyclically read from the recirculating memory to refresh the character being displayed, the nonvideo data thus displayed may be read and used for control purposes.

More particularly, the nonvideo data stored with the video code of a character may be employed to restrict the type of character that may be substituted therefor by an operator, such as in a message format having fields of data to be entered by the operator, each character position of a given field being indicated by a control symbol in accordance with an embodiment of the invention. The control symbol includes nonvideo data restricting substitution therefor to numeric, alphabetic, or either one of the numeric and alphabetic types. The video code of the control symbol is selected to produce a visual indication of the type of character to be entered. The nonvideo code designating the type of character to be entered is selected to be 01 for numeric characters, 10 for alphabetic characters and 11 for either one of the numeric and alphabetic types. The two bits of the nonvideo code are stored in the eighth bit positions of the first two strokes of the video code for the control symbol.

Selection of a character type from a larger number of choices may be readily provided by employing a larger number of nonvideo bits in the video code of each control symbol. For instance, three nonvideo bits may provide a choice from seven different types.

A format control network samples the nonvideo code bits of each character read from the recirculating memory for display and compares that code with a code representing the type of character which the operator seeks to enter for that character just read. A decoder associated with the keyboard entry system decodes the character being entered by the operator and transmits to the comparator an appropriate code, 01 for numeric, and 10 for alphabetic. If the nonvideo code of the control symbol is 11, thereby specifying either a numeric or an alphabetic character, the comparator will not indicate the test has failed if the character being entered is of either type but will indicate the test has failed if the character being entered is of still another type, such as a punctuation mark, arithmetic symbol or any other type of character which may be entered from the keyboard. If the test fails, an error flip-flop is set and the operator may not proceed until the proper type of character has been entered. Thereafter, if the operator seeks to transfer the message format to the file storage or an external system, the eighth bit position of each character stroke of all characters being transferred is sampled and if a binary "1" is present in any of those positions, an error flip-flop is set to terminate the transfer and signal to the output buffer and control network of the file storage and control unit that transfer has been terminated. The operator must then complete the fields of the message by entering an appropriate character for each control symbol still present, thereby removing any binary "1" digits remaining in the eighth bit position of character strokes in the message before reinitiating transfer of the message.

The novel features of the invention are set forth with particularity in the appended claims. The invention will best be understood from the following description when read in conjunction with the accompanying drawings.

DESCRIPTION OF THE PREFERRED EMBODIMENT

Figure 6:
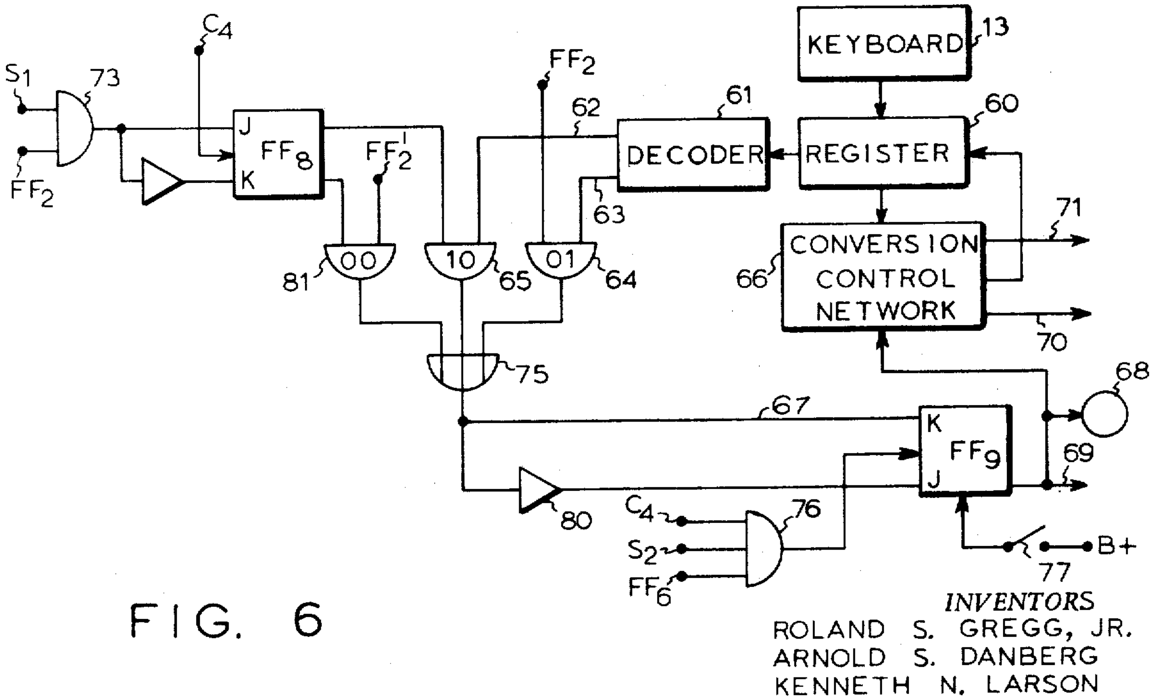
FIG. 6 is a block diagram illustrating an embodiment of one feature of the present invention, namely a system that will check upon each keyboard entry to determine whether a particular type of character has been specified by a control symbol and if so to allow only the type of character specified to be entered for display.
Figure 7:
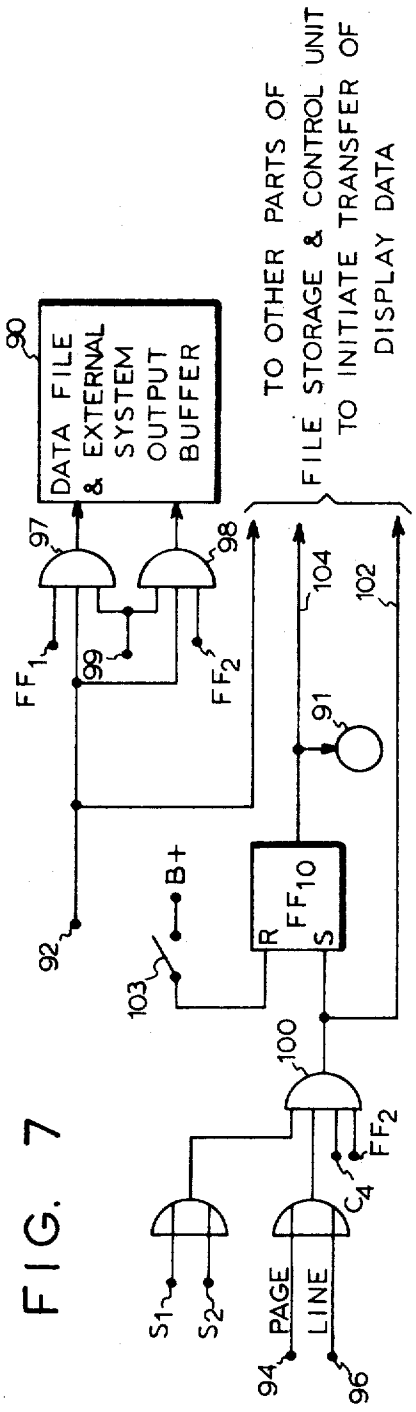
FIG. 7 is a block diagram illustrating an embodiment of a further feature of the present invention which is to determine that appropriate characters have been entered in each position of a message format indicated by control symbols before the message may be transferred to file storage or an external system.

The present invention will be described first with reference to FIGS. 1 to 5 which illustrate an exemplary display system for which an embodiment of the present invention has been devised as illustrated in FIGS. 6 and 7. Accordingly, "the present invention", or words of similar import, with reference to FIGS. 1 to 5 should be understood to mean "when considered in conjunction with FIGS. 6 and 7".

Figure 1:
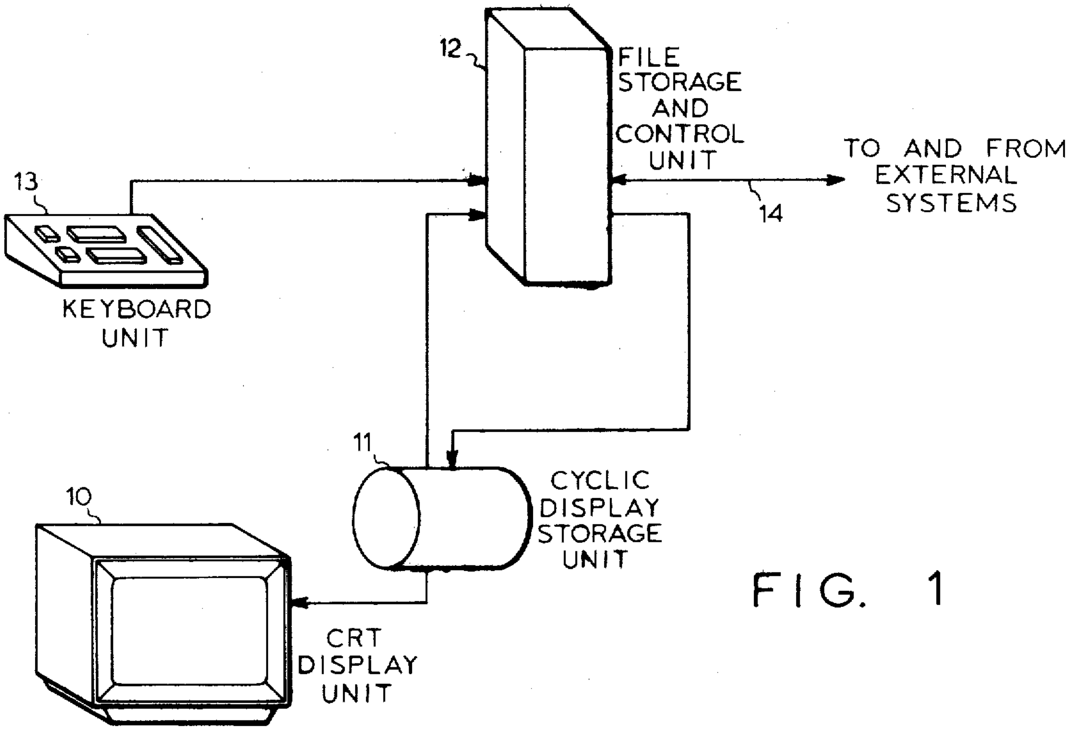
FIG. 1 is a general block diagram of an illustrative data display system for which the present invention is intended.

Referring now to FIG. 1, a CRT display unit 10 is provided with a cyclic display storage unit 11, such as a magnetic drum having a plurality of tracks from which data to be displayed is cyclically read for regeneration of characters on a CRT screen. A file storage and control unit 12 provides bulk storage of data that may be displayed and the necessary logic networks for controlling the transfer of data to the display storage unit 11 and, in accordance with the present invention, for editing data by selective insertion of characters in positions marked by a cursor displayed as a blinking block consisting of 35 dots in a 5×7 matrix.

The transfer of data for display is controlled by an operator through a keyboard unit 13. The keyboard is also adapted to give the user maximum ability to arrange, manipulate, format, inspect, and edit by inserting and removing display data. The file storage and control unit 12 is also adapted for use with external systems through an optional interface represented by a bidirectional transmission line 14.

Figure 2:
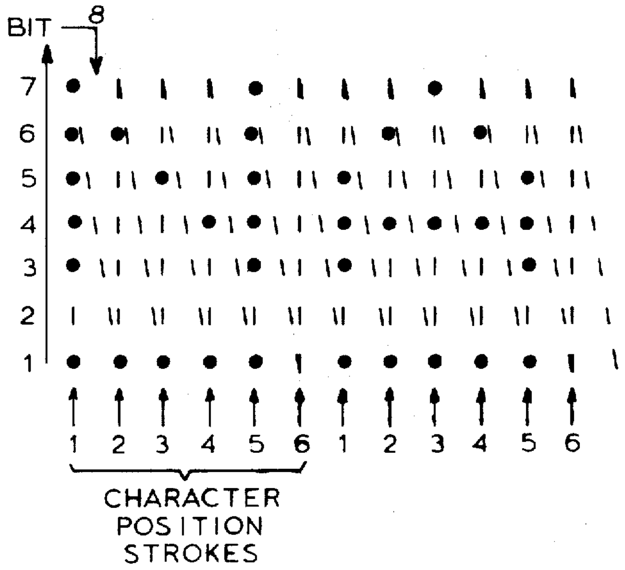
FIG. 2 illustrates an exemplary manner of producing symbols including alphanumeric characters for display in the system of FIG. 1, and in particular for displaying control symbols in accordance with an exemplary embodiment of the present invention.

FIG. 2 illustrates an exemplary manner for producing characters on the CRT display unit 10 using a 5×7 dot matrix generated as the beam sweeps through six successive vertical strokes for each character under the control of a sawtooth wave generator. As will be explained hereinafter, the video code format of the data in the display storage unit is arranged in eight bit stroke groups with each group corresponding to a different beam stroke. Thus, during any given stroke, the beam is selectively unblanked at each of seven points depending upon whether a binary "1" or "0" is stored in the display storage unit in a position corresponding to that point. For example, to display a "control symbol" in fields of a message format to be completed, a binary "1" is stored in each bit position of the storage unit corresponding to the first dot position of each of five successive strokes as shown in FIG. 2, thereby causing a bar to be displayed below a symbol indicating to an operator that a character is to be entered in that position. The type of character to be entered is designated by the letter N for numeric and the letter A for alphabetic above the bar as shown in FIG. 2. If either a numeric or alphabetic character may be entered, the control symbol will include an X above the bar instead of the letter N or the letter A.

To display the letter N in a control symbol, the video code representative thereof stored in the storage unit would include a binary "1" in each of the bit positions 3 through 7 of the first and fifth stroke groups and a binary "1" in bit positions 6, 5 and 4 respectively of the stroke groups 2, 3 and 4 of a character set of stroke groups. An eighth bit position in each stroke group corresponds to the time interval in which the CRT beam is blanked and caused to return to the base of the line for the next stroke. After the eighth bit time of the fifth stroke, the beam remains blanked for the entire eight bit times of the sixth stroke to provide an intercharacter space, such as the space between the control symbols *N* and *A* shown in FIG. 2.

Since the CRT beam is blanked during the sixth stroke of each character position, the bit positions comprising the sixth stroke group in the storage unit may be used to store whatever nonvideo information is desired. Thus, in accordance with the present invention, one of the bit positions read during the sixth stroke is employed to store a cursor signal so that upon reading that signal the storage and control unit 12 will cause the CRT unit 10 to display a cursor symbol, i.e., dot in each of 35 positions of the next character to indicate to the operator the position at which an entered character will be displaced. For example, if a cursor signal is stored in the code group for the sixth stroke of the video code for the control symbol *N* in FIG. 2, the file storage and control unit 12 will cause a block of 35 dots to be superimposed on the control symbol *A* thereby indicating to the operator the position at which an entered character will be displayed. The fact that the cursor symbol coincides with an alphabetic control symbol, however, means that only an alphabetic character will be accepted for entry in that position. The cursor signal is used to time the storing of the video code for the new character in the display storage unit.

The file storage and control unit 12 will respond to a cursor signal to generate a block marker, i.e., a cursor symbol, only a fraction of the cycles that the display storage unit 11 operates to refresh the display produced on the CRT screen. In that manner, the cursor symbol appears as a blinking block to allow the operator to continue to view the character already in that position. The operator may key any character he wishes to enter into the position marked by the cursor symbol. The storage and control unit 12 then enters the video code of that new character into the display storage unit 11 in place of the video code for the character already being displayed.

The file storage and control unit 12 not only enters the video code for the new character but also automatically advances the cursor signal from the sixth stroke code group of the the preceding character to the sixth stroke code group of the character being entered. The operator may also advance the cursor signal from one character position to the next by operating the appropriate key, or to any other position by operating the other keys.

It should be understood that the file storage and control unit 12 includes function control logic which sequences the data flow, entry, and manipulation. Thus, when a function is specified by the operator at the keyboard unit 13, a function code converter in the unit 12 sends a service request to function control logic also in the unit 12 in order that the appropriate sequence be initiated.

The file storage portion of the unit 12 consists of a drum with a plurality of tracks to be used as required not only to store data, but also to manipulate data. In practice, the display storage unit 11 may also be implemented on the same drum. However, it should be understood that the file storage may, for example, be comprised of magnetic cores. The display storage unit 11 may also be of another form, such as recirculating delay lines, or even a block of core memory having word memory locations read cyclically, each word having 48 bits for the six character strokes, or the equivalent. The words would then be read from such a core memory in sequence into a bit serializer, such as a shift register.

When a keyboard operator requests a transfer of data from the unit 12 to the display storage unit 11, the unit 12 locates the data in the file and transfers it to the display storage unit 11 in the appropriate video code. This usually requires code conversion since data is preferably stored in the unit 12 in the standard ASCII code. The data in video format entered into the display storage unit 11 is synchronized with the CRT display unit 10, as by clock and index pulses stored on separate tracks of the display storage unit. In other words, the beam roster scan of the CRT display unit 10 operates in synchronism with the cyclic display storage unit.

Figure 3:
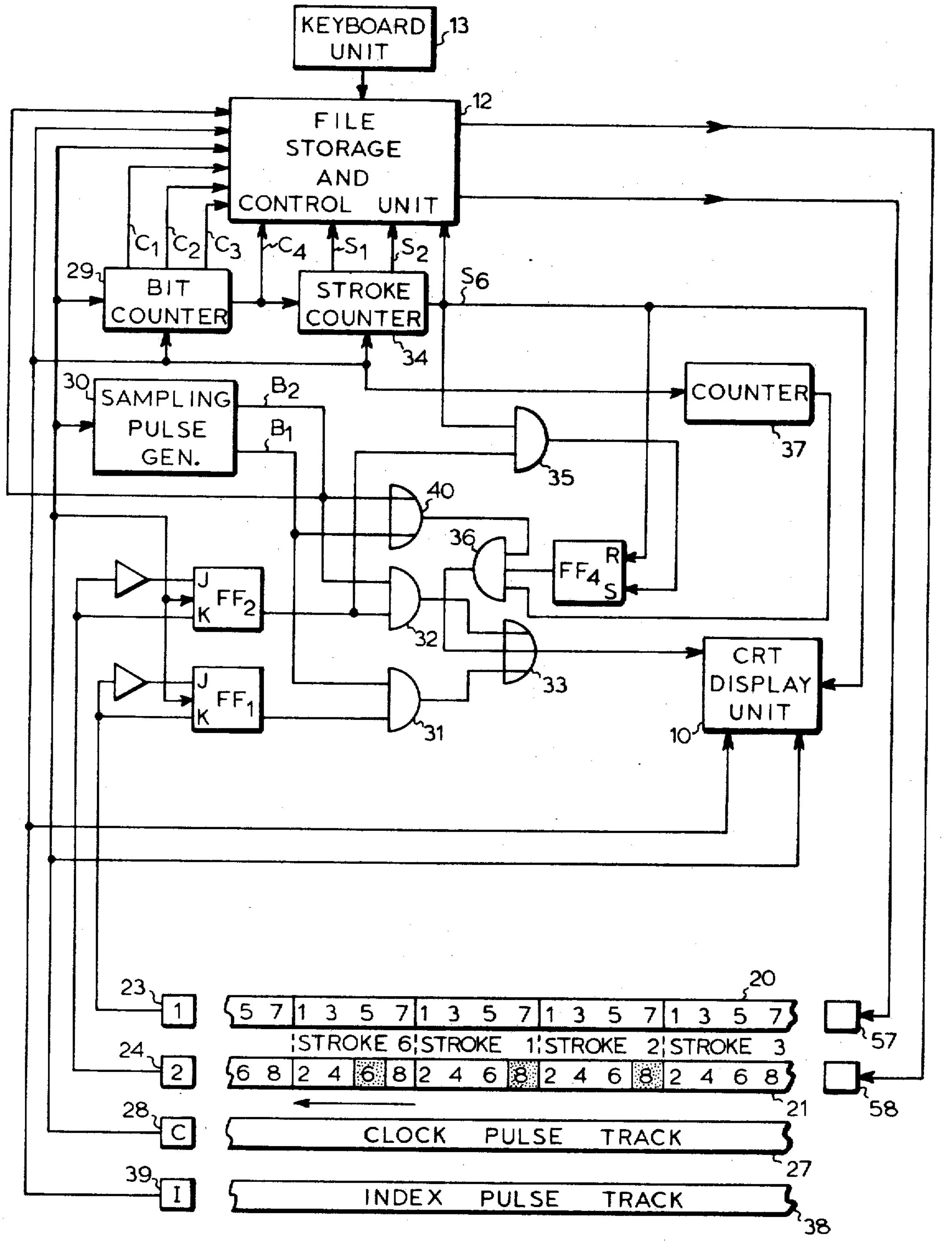
FIG. 3 is a block diagram illustrating the manner in which all symbols, including alphanumeric characters, are displayed, and the manner in which a given character position is made available to the operator for entering a symbol, thereby substituting a new symbol for any previously displayed symbol.

A detailed block diagram illustrating an embodiment of the present invention will now be described with reference to FIG. 3 wherein the CRT display unit 10, the file storage and control unit 12 and the keyboard 13 are shown in block form only inasmuch as each may be conventionally implemented, as in any one of several commercially available CRT display systems. Accordingly, FIG. 3 shows in somewhat more detail only that part of the cyclic display storage unit 11 which exemplifies the present invention and which in practice, is an integral part of the file storage and control unit 12 as noted hereinbefore. It should also be understood that only so much of the display storage unit is shown in FIG. 3 as is necessary to understand and practice the present invention.

Drum tracks 20 and 21 are dedicated for storage of video codes, one video code consisting of eight bits for each stroke group of a character. As noted hereinbefore with reference to FIG. 2, six strokes are required for each character so that a total of 48 binary digits are stored on the tracks 20 and 21 for each character, half on one track and the other half stored in parallel on the second track. For instance, for the sixth stroke group, the odd numbered bits are stored in the track 20 and the even numbered bits are stored on the track 21. A single track could be employed to store all bits in sequence, but two tracks are preferred to avoid bit density problems on the magnetic record media. Four, or even eight, tracks could also be used but with present recording techniques, such would not be necessary. Moreover, the necessary serializing of four or eight bits would be more complex. Accordingly, a two-track display storage system is deemed to be the optimum configuration, but future technology may make a one-track system more feasible.

For convenience, the bit positions are indicated in FIG. 3 by the arabic numerals 1 to 8, but it should be understood that in each bit position only a binary "0" or a binary "1" is stored in accordance with the code required for generation of the character to be displayed. For instance, to display the letter N, the fourth stroke group (see FIG. 2) would contain a binary "1" in bit position 3 and a binary "0" in all other bit positions 1, 2, 4, 5, 6 and 7. In the eighth bit position, either a binary "1" or a binary "0" may be stored since the beam is blanked during the eighth bit time of each stroke group, but in practice, a binary "0" is stored unless nonvideo information is to be stored with the video code group.

The beam is also blanked during all eight bit times of the sixth stroke group so that, for video display purposes, it is not material what binary digit is stored in each bit position, although in practice a binary "0" is stored in each bit position unless it is desired to store some nonvideo information. In accordance with the present invention, a cursor signal is stored in one of the bit positions of a sixth stroke group, preferably as a binary "1" in bit position 6. Thus, by allocating one of the bit positions in a sixth (intercharacter space) stroke group for storage of a cursor signal, the next character position is marked as the video code group into which a character may be entered. Accordingly, the cursor position can be defined without the use of a separate track to carry the cursor signal.

The sixth bit position of a sixth stroke group is preferably utilized to store the cursor signal because as the cursor signal is transferred from one character position to another, it is necessary to erase the binary "1" in its present location and store a binary "1" in the next location, without disturbing binary digits of the video code in the new location. Therefore, because of flux fringing which cannot be avoided, the bit positions on either side of the cursor signal position should not be used. This requirement is imposed by the high bit density (e.g., 680 bits per inch) employed in the tracks 20 and 21. In a display storage unit having a lower bit density, it would be possible to selectively alter a single bit in any position without affecting bits stored in adjacent positions, in which case there would be no restrictions on the bit positions of the sixth stroke group selected for storing the cursor signal.

The video codes of successive characters are read from the tracks 20 and 21 by read heads 23 and 24, and stored in sequential pairs by buffer flip-flops $FF_1$ and $FF_2$, preferably JK flip-flops triggered by clock pulses read from a clock pulse track 27 by a read head 28. Accordingly, the read head 28 generates four clock pulses for each stroke. A bit counter 29 counts the four clock pulses to generate distinct clock signals $C_1$, $C_2$, $C_3$ and $C_4$ for each pair of video code bits read. The clock pulses from the read head 28 are also applied directly to a sampling pulse generator 30 which transmits a pair of strobe signals $B_1$ and $B_2$ for each pair of stroke group bits read by the heads 23 and 24 in order to transmit to the CRT display unit 10 the code group bits in proper serial sequence through sampling gates 31 and 32. Strobe pulse $B_1$ samples the binary digit stored in the flip-flop $FF_1$ to transmit to the CRT display unit 10 the odd numbered bits of each stroke group via an OR gate 33, while a sampling pulse $B_2$ similarly samples the even numbered bits stored in flip-flop $FF_2$. Thus, while the video code for a stroke is read in pairs into buffer flip-flops $FF_1$ and $FF_2$ in response to clock pulses, the sampling pulse generator 30 so responds to clock pulses as to cause each pair of binary digits to be transmitted to the CRT display unit 10 in series. Accordingly, flip-flops $FF_1$ and $FF_2$ function as a parallel memory output register while gates 31 and 32 function as a parallel-to-serial converter in response to sampling.

Figure 5:
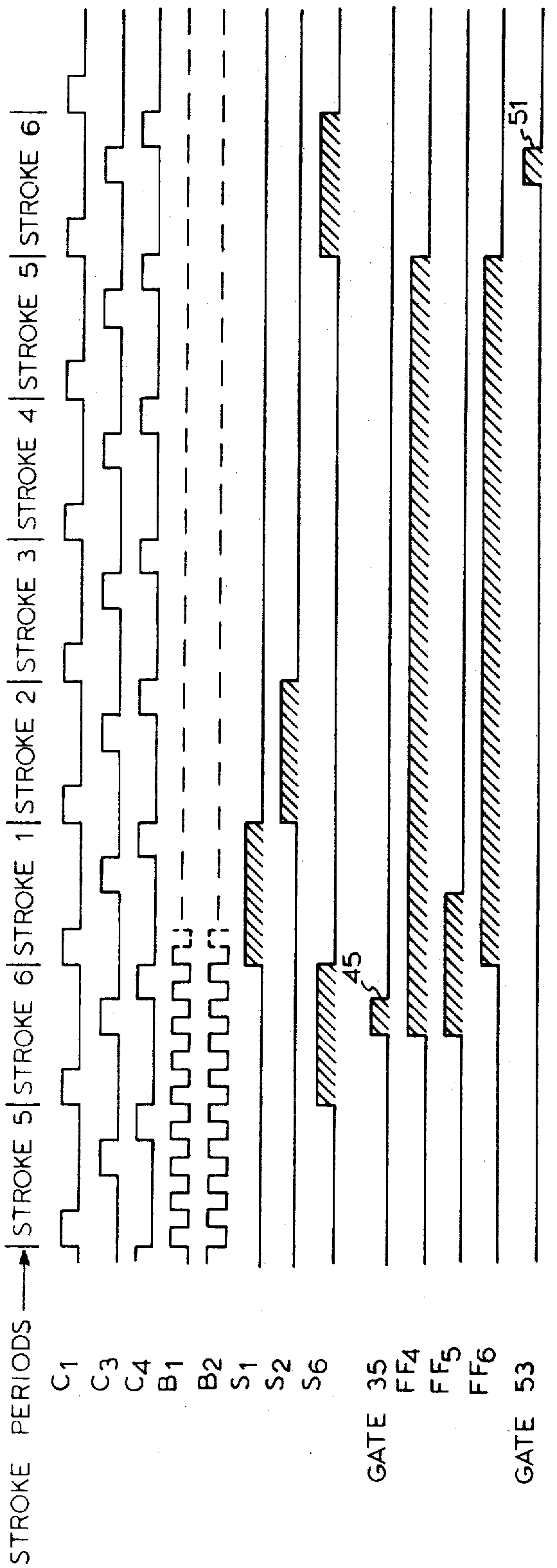
FIG. 5 is a timing diagram for the operation of the system of FIG. 3 with the data entry control section of FIG. 4.

The bit counter 29 transmits the successive clock signals $C_4$ to a stroke counter 34 which produces a signal $S_6$ during the intercharacter space group of each character being displayed, as shown in the timing diagram of FIG. 5. The signal $S_6$ from the stroke counter 34 enables an AND gate 35 to transmit to a flip-flop $FF_4$ any binary "1" stored in flip-flop $FF_2$ from bit position 6 of the sixth stroke group of each character being displayed. If a cursor signal is stored in the sixth bit position as described hereinbefore, the flip-flop $FF_4$ is set and thereafter reset by the leading edge of the next stroke signal $S_6$ as shown in the timing diagram of FIG. 5.

The true output terminal of the flip-flop $FF_4$ is connected to an AND gate 36. The output terminal of the AND gate 36 is in turn connected to the CRT display unit 10 via the OR gate 33. In that manner, the flip-flop $FF_4$ will enable the display unit 10 to produce a dot at each of the 35 positions of the following character, i.e., during strokes 1 to 5 of the next character. If 35 dots were displayed during each cycle of the cyclic display storage unit 11 (FIG. 1) comprising the magnetic drum tracks 20 and 21 shown in FIG. 3, they would completely obscure the character, if any, being displayed. In order to display the cursor symbol without obscuring the character to be displayed at the same position, the gate 36 is further controlled by a counter 37 operative only a fraction of the time the character being marked by a cursor signal is to be regenerated on the face of the CRT. For example, the counter 37 may consist of two binary circuits in cascade in order to effectively divide the number of cursor signals displayed by four, thereby rendering the gate 36 operative only every fourth time the character being marked is to be regenerated. However, instead of counting the cursor signal, which occurs only once during each cycle of the track 21, a system synchronizing index pulse is counted. That index pulse is stored on a separate track 38 and read by a head 39.

The gate 36 is also connected to the two output terminals of the sampling pulse generator 30 by an OR gate 40 in order that generation of dots for the display of a blinking block (i.e., cursor symbol) be synchronized by strobe signals $B_1$ and $B_2$ in the same manner that generation of dots for the display of a character is synchronized by the strobe signals $B_1$ and $B_2$ through gates 31 and 32. However, it should be understood that such synchronization, as well as other synchronization indicated in FIG. 3, is a mere matter of design that depends upon the manner in which the CRT display unit 10 is implemented, rather than upon the concepts of the present invention. The same is also to be understood of all synchronization indicated in FIG. 3 for the file storage and control unit 12, bit counter 29 and stroke counter 34 shown connected to the read heads 28 and 39 for clock and index pulses.

The flip-flop $FF_4$ is set during the last half of the sixth stroke if a cursor signal is present in bit position 6. Accordingly, a dot would normally be produced during bit time 7 of stroke 6 but, as noted hereinbefore, the beam of the CRT display unit 10 is blanked during the entire period of the sixth stroke. Consequently, dots are displayed in response to the output of the flip-flop $FF_4$ during each bit position of only strokes 1 to 5 of the following character positions (except the retrace bit position 8 of each such stroke).

Once the operator observes which character position is available for entry, as manifested by a blinking block in a character position of the CRT display unit 10, and he decides to enter a character in that position, he simply depresses the appropriate character key on the keyboard 13. The file storage and control unit 12 then immediately accepts a code representing the character to be entered and stores it in a buffer register until the cursor signal is again read and sampled to set the flip-flop $FF_4$, at which time the cursor signal is erased from bit position 6 of the sixth stroke group preceding the character position on the tracks 20 and 21 into which a new character is to be entered. Following that, the file storage and control unit 12 enters the new character and stores a binary "1" in bit position 6 of the sixth stroke group in that character position into which the new character has just been entered, thereby advancing the cursor signal to the next character position as a character is entered. The cursor signal may also be advanced to the next character position without entering a character simply by depressing an appropriate key on the keyboard unit 13.

Figure 4:
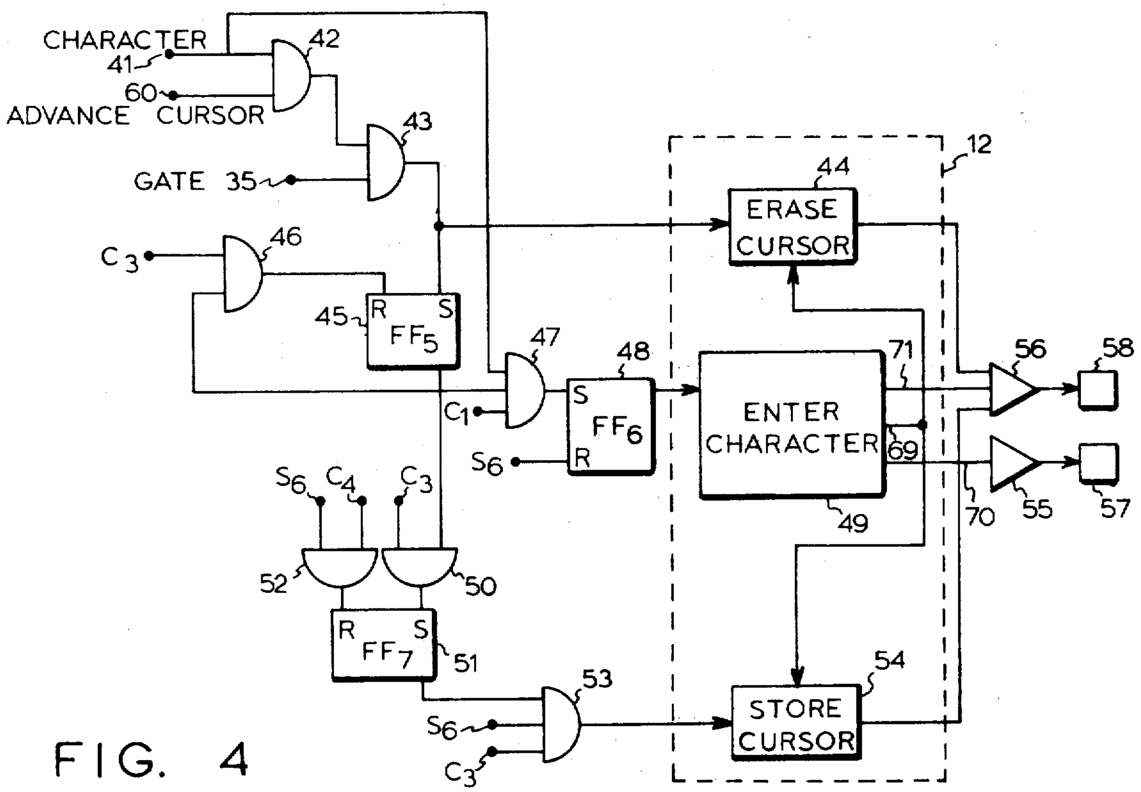
FIG. 4 is a block diagram illustrating an exemplary form of a data entry section of a control unit for the system of FIG. 3.

The manner in which the file storage and control unit 12 controls entry of a new character and advances the cursor signal from one position to the next will now be described with reference to an exemplary implementation illustrated in FIG. 4. When any key on the keyboard unit 13 (FIG. 3) is depressed to enter a character, a signal is transmitted to an input terminal 41 of an OR gate 42 to enable an AND gate 43 to transmit a pulse from gate 35 (FIG. 3), as indicated by the legend "GATE 35" at an input terminal of the AND gate 43. That pulse 45 (shown in FIG. 5) is transmitted by the AND gate 43 to control logic 44 of the file storage and control unit 12 which stores a binary "0" in the sixth bit position from which the cursor signal was just read, thereby erasing the cursor signal. That pulse is also transmitted by the AND gate 43 to a buffer flip-flop $FF_5$.

As shown in FIG. 5, the flip-flop $FF_5$ is set during the period of the pulse $C_3$ of the sixth stroke if a cursor signal is present in the sixth bit position and then reset by the next pulse $C_3$ via an AND gate 46. While the flip-flop $FF_5$ is set, an AND gate 47 is enabled in order that the next pulse $C_1$ may set a flip-flop $FF_6$, but only if a character has been entered and a signal is present at the input terminal 41. The flip-flop $FF_6$ remains on for five full strokes of the next character, as shown in FIG. 5, and is then reset by the next stroke signal $S_6$. In that manner, the flip-flop $FF_6$ transmits a signal to a control logic network 49 that initiates entry of the character selected by the operator in the position indicated by the cursor signal just erased.

The output terminal of the flip-flop $FF_5$ is also connected to an AND gate 50 to enable it to set a flip-flop $FF_7$ in response to the next pulse $C_3$, the same pulse $C_3$ which resets the flip-flop $FF_5$. The flip-flop $FF_7$ remains set until the end of the fifth stroke period, at which time the next stroke signal $S_6$ enables an AND gate 52 to reset it in response to the next pulse $C_4$. Accordingly, the flip-flop $FF_7$ remains set until after the pulse $C_3$ of the next stroke 6. While it is set, the flip-flop $FF_7$ enables an AND gate 53 to transmit a pulse 51 (FIG. 5) to a logic network 54 in response to a pulse $C_3$ during the next stroke signal $S_6$ to store a binary "1" in the sixth bit position of the sixth stroke of the character being entered.

The logic networks 44, 49 and 54 are connected to a pair of recording amplifiers 55 and 56 which are connected to respective write heads 57 and 58 associated with tracks 20 and 21 as shown in FIG. 3. Accordingly, only the amplifier 56 connected to the head 58 receives recording signals from all three of the logic networks 44, 49 and 54 since a cursor signal is stored only in track 21. Both heads 57 and 58 are so positioned on their respective tracks 20 and 21 as to allow for delays in causing binary digits to be recorded through the logic networks 44, 49 and 54. In that manner, when a new character is entered, it is properly entered in the character position specified by the cursor signal and the cursor signal is advanced one character position.

If the operator depresses a key to advance the cursor signal without entering a character, a signal is transmitted to an input terminal 60 of the OR gate 42 so that the same functions are then initiated in the logic networks 44 and 54, but not in the logic network 49 because the AND gate 47 connected to the set input terminal of the flip-flop 48 is not then enabled by an input signal from the terminal 41. If both keys are actuated at the same time, the result is, of course, as though only the "enter character" key is depressed. Although not shown, the signals at input terminals 41 and 60 are provided by buffer flip-flops which are set when the respective keys are actuated, and reset when the action indicated thereby is complete so that, for example, the same character is not entered automatically in all subsequent character positions of the display storage. The character input register, also not shown, is cleared at the same time, all in accordance with normal techniques for interfacing digital equipment with a keyboard for entering data.

Referring now to FIG. 6, when the operator actuates a character key, a code representative of the character is entered into a register 60 of the file storage and control unit 12 (FIG. 1). The code may comprise a standard 8-bit code consisting of a 7-bit American Standard Code for Information Interchange (ASCII) and one bit for parity check. A decoder 61 is provided to ascertain whether the code stored in register 60 represents an alphabetic or numeric character. Since the ASCII code identifies numeric characters by a code group 110 in bit positions 5, 6 and 7, respectively, the decoder 61 can include a three input AND gate to detect that code group and other gates responsive thereto for transmitting over lines 62 and 63 binary digits 0 and 1 respectively. The ASCII code for alphanumeric characters includes a code group of 001 or 101 in bit positions 5, 6 and 7. Accordingly, a pair of AND gates and an OR gate may be employed in the decoder 61 to detect either of those code groups and transmit over lines 62 and 63 the binary digits 1 and 0, respectively. In that manner, the decoder 61 transmits to a pair of AND gates 64 and 65 a binary code 01 for numeric characters and 10 for alphabetic characters.

In accordance with the present invention, the type of character (i.e., alphabetic, numeric, or otherwise) designated by an operator to be entered into a position containing a control symbol is compared with the character type defined by the control symbol to determine whether the entry is permissible or whether an error should be indicated. As will be explained in detail hereinafter, the character type defined by a control symbol is specified by bits stored in the eighth bit positions (i.e., stroke retrace bit times) of certain ones of the stroke groups of the character set (i.e., six stroke groups) defining the control symbol. In the preferred embodiment of the invention, as represented in FIG. 3, the eighth bit positions of stroke groups 1 and 2 of a six stroke group character set are used to define a permissible character type.

The register 60 is also connected to a control network 66 for converting the character stored in the register 60 from the ASCII code to a video code, and for thereafter entering the character in the position indicated by the blinking block (cursor symbol) as described hereinbefore with reference to FIG. 3, but only if the code from the decoder 61 compares with the permissible character type defined by the binary digits read from the eighth bit positions of the first and second stroke groups of the character position marked by the cursor symbol. If the comparison test fails, a pulse is not transmitted to the control network 66 over a line 67 to initiate the procedure for converting and entering the character code into the storage unit. Instead, a flip-flop $FF_9$ is set to energize an alarm 68 and transmit a signal over a line 69 which will inhibit the control networks 44 and 54 (FIG. 4) from erasing the cursor signal in its present position and advancing it to the next character position since the character selected by the keyboard operator did not pass the comparison test provided by the AND gates 64 and 65, and therefore is not to be entered. If the comparison test is successful, and the operation of the control network 66 is initiated by a pulse over the line 67 the video code is transmitted over lines 70 and 71 to recording amplifiers 55 and 56 shown in FIG. 4. Accordingly, it should be understood that the system of FIG. 6 is an integral part of the control logic 49 of FIG. 4. For that reason, the output lines from the control network 49 are identified by the same reference characters 69, 70 and 71.

As noted hereinbefore with reference to FIG. 2, if the character in the position being marked for entry by a cursor signal is a control symbol designating the type of character that must be entered, a binary "1" will be present in the eighth bit position of the second stroke for a numeric character to be entered and a binary "1" in the eighth bit position of the first stroke for an alphabetic character. Those bit positions are shaded in the schematic diagram of FIG. 3 which shows that they will be read from the read head 24 into the flip-flop $FF_2$ during the stroke signals $S_1$ and $S_2$ from the stroke counter 34 of FIG. 3 following the detection of a binary "1" in the sixth bit position of the sixth stroke of the preceding character which is also shaded in FIG. 3. Since the binary "1" in the sixth bit position is a cursor signal which indirectly causes flip-flop $FF_6$ to be set during the first five strokes of the following character position, the character position into which a new character is to be entered is visually marked.

The manner in which the binary digits read from the eighth bit positions of the first two strokes of the character position following a cursor signal will now be described with reference to FIGS. 3 and 6. The eighth bit of the first stroke is read first by the read head 24 and stored in the buffer flip-flop $FF_2$. From there it is transferred to a second flip-flop $FF_8$ for storage until the eighth bit of the second stroke is read through the same head 24. Accordingly, an AND gate 73 is connected to the JK terminals of the flip-flop $FF_8$ in response to the timing signal $S_1$ generated by the stroke counter 34 (FIG. 3) during the four clock periods $C_1$ through $C_4$ of the first stroke. The trigger input terminal of the JK flip-flop $FF_8$ is connected to the bit counter 29 (FIG. 3) to receive the clock pulse $C_4$ in order that the flip-flop $FF_8$ not be set in accordance with the state of the buffer flip-flop $FF_2$ until the eighth bit of the first stroke is stored therein. The next clock pulse $C_4$ which occurs during the second stroke of the character enables an AND gate 76 to trigger a JK flip-flop $FF_9$ into a set state when the test of the comparator comprising gates 64 and 65 fail. The flip-flop $FF_6$ is also connected to the AND gate 76 in order that it be effective only during the five strokes of the character marked by the cursor signal. The output of the AND gate 76 is effective only during the second stroke period because a third input is connected to the timing signal $S_2$ from the stroke counter 34. The gate 76 also has an input terminal connected to the timing signal $C_4$ in order that it effectively time the comparison made by gates 64 and 65 to be at the same time a binary digit is read from the eighth bit position of the second stroke.

If the control symbol is *N* as shown in FIG. 2, a binary "1" will be present in the eighth bit position of the second stroke. Accordingly, for the comparison test to be successful, the code from the decoder 61 must be 01 for a numeric character from the keyboard 13. If it is, the AND gate 64 will transmit a time signal over the line 67 via the OR gate 75 to K terminal of the flip-flop $FF_9$ so that when the gate 76 is enabled, the flip-flop $FF_9$ is reset. The conversion control network 66 then proceeds to convert the ASCII code of the character into a video code for entry via control logic 49 (FIG. 4). If the character from the keyboard 13 is alphabetic, the output of the AND gate 64 will be false, in which case, the output terminal of the OR gate 75 coupled to a JK flip-flop $FF_9$ will cause it to be set in response to the timing signals $C_4$, $S_2$ and $FF_6$ connected to the AND gate 76. The flip-flop $FF_9$ actuates the alarm 68 upon being set and transmits over the line 69 an inhibit signal to the control networks 44 and 54 of FIG. 4 as described hereinbefore. It also terminates operation of the conversion control network 66. In that manner failure to key a numeric character when the control symbol calls for a numeric character will result in the operation of the conversion control network 66 being terminated and operation of control logic 49 being inhibited from entering a character and advancing the cursor signal to the next position. The flip-flop $FF_9$ must then be manually reset by actuation of switch 77 through the keyboard unit 13 (FIG. 3) before another character is entered.

If the control symbol calls for an alphabetic character to be entered, a binary "1" will be read from the eighth bit position of the first stroke into the buffer flip-flop $FF_8$ as described hereinbefore so that when the comparison is made during the second stroke period (in response to a signal $S_2$ from the stroke counter 34 of FIG. 3 connected to the AND gate 76), a time signal is transmitted over the line 67 to cause the flip-flop $FF_9$ to be reset so that code conversion, character entry and cursor signal advancement will proceed in a normal manner. If a numeric character is entered into the register 60 through the keyboard 13 while the control symbol for an alphabetic character is present in a character position marked for entry in response to a cursor signal, the AND gate 65 will not have a binary "1" present on the line 62 to compare with a binary "1" present in the flip-flop $FF_8$. Accordingly, the AND gate 65 will not transmit a true signal to the K terminal of the flip-flop $FF_9$ through the OR gate 75 at the time the AND gate 76 transmits a pulse to the trigger input terminal of the flip-flop $FF_9$. Instead, a true signal is transmitted to the J terminal via an inverter 80, thereby causing the flip-flop $FF_9$ to be set in response to a timing signal from the AND gate 76. In that manner, entry of the alphabetic character and advancement of the cursor signal is inhibited.

If the control symbol present in the character position marked by a blinking block in response to a cursor signal is *X*, a binary "1" will be read from the eighth bit position of both the first and the second stroke groups since the control code of the symbol $X$ is 11 to specify that either one of the numeric and alphabetic types of characters may be entered, but not other characters. For the purpose of this invention the other characters may include all other possibilities such as punctuation marks, and even a blank space, which the operator may otherwise key for display. In that event, a binary "1" will be present at the AND gate 64 from the flip-flop $FF_2$ and at the AND gate 65 from the flip-flop $FF_8$ so that if the operator keys either an alphabetic or a numeric character, the decoder 61 will transmit over the lines 62 and 63 either a 10 or a 01 code to enable one of the comparator gates 64 and 65 to transmit a pulse over the line 67 to cause the flip-flop $FF_9$ to be reset and allow conversion and entry of the character keyed. If the operator keys any other type of character, the decoder 61 will transmit over the lines 62 and 63 a code 00 so that neither comparator gate 64 or comparator gate 65 will have a binary "1" at two data input terminals for comparison at the time the JK flip-flop $FF_9$ is triggered via AND gate 76.

When the character position marked for entry by a blinking block in response to a cursor signal does not have a control symbol present, the operator may freely substitute any character since the eighth bit position of the first and the second stroke contains a binary "0." The binary "0" from the eighth bit position of the first stroke is stored in the flip-flop $FF_8$. An AND gate 81 connected to the false output terminal of the flip-flop $FF_8$ and the false output of the flip-flop $FF_2$ (FIG. 3) transmits a true output signal on line 67 to cause the JK flip-flop $FF_9$ to be reset in response to a timing signal from the AND gate 76, and thereby allow any character selected to be entered.

After the operator finishes entering characters into the various fields of a format message, such as the longitude and latitude of a ship in a position report to be transmitted to a control station, or to be simply placed in the file storage and control unit 12 for future reference, he may initiate transfer of the message from the cyclic display storage unit 11 to a data file and external system output buffer 90 shown in FIG. 7. It should be understood that such a buffer is an integral part of the file storage and control unit 12, but is functionally shown separately in FIG. 7 to facilitate describing a format completeness test made on all transfers attempted from the display storage unit 11 to file storage or to an external system. If the format completeness test fails, a flip-flop $FF_{10}$ is set to actuate an alarm 91. At the same time, the transfer operation is terminated by simply having control flip-flops in the file storage and control unit 12 reset. It should be noted that the error flip-flop $FF_9$ and the error indicator 68 of FIG. 6 may be employed for the completeness test, but for simplicity a separate flip-flop $FF_{10}$ and indicator 91 have been shown.

Transfer of data is initiated by a key on the keyboard unit 13 (FIG. 1) which sets a flip-flop (not shown) in the file storage and control unit 12 until the transfer has been completed, at which time that flip-flop is reset in a normal manner. A signal from the true output terminal of that transfer flip-flop is transmitted to an input terminal 92 shown in FIG. 7. The transfer signal is also transmitted over a line 93 to other parts of the unit 12 (FIG. 3) as required to control transfer of data. In a similar manner, the operator indicates whether he wishes to transfer all of the data displayed (which may be referred to as a page), or to simply transfer a line of the page. If the page is to be transferred, an appropriate flip-flop (not shown) is set in the file storage and control unit 12 in synchronism with an index pulse read from the track 38 by a head 39. The page flip-flop is then reset by the next index pulse read from the same track. If only a line is to be transferred, a different flip-flop (not shown) is set when the beam has been returned to the first character of that line. That line flip-flop is then reset when the beam has completed regeneration of the last character of the line selected. When the page flip-flop is set to transfer the entire page, a true signal is transmitted by that flip-flop to an input terminal 94 of an OR gate 95. If the line flip-flop is set to transfer only a line, a true signal is transmitted from that flip-flop instead to an input terminal 96 of the OR gate 95.

A transfer signal at terminal 93 allows AND gates 97 and 98 to transfer video code bits to the output buffer 90 from the flip-flops $FF_1$ and $FF_2$ (FIG. 3), in response to clock pulses at an input terminal 99 from the read head 28 (FIG. 3). Transmission to the data file or external system takes place thereafter, but only as long as the flip-flop $FF_{10}$ is not set by an AND gate 100 which samples the eighth bit position of every stroke of each character in the line or page being transferred. That is accomplished by connecting one input terminal of the AND gate 100 to the true output terminal of the buffer flip-flop $FF_2$ and another input terminal to the output line $C_4$ of the bit counter 29. Still another input terminal of the AND gate 100 is coupled by OR gate 101 to the stroke counter 34 (FIG. 3) to receive stroke signals $S_1$ and $S_2$. If a binary "1" is present in the eighth bit position of strokes 1 and 2 of any character being transferred, the AND gate 100 transmits a pulse to thereby terminate transfer of data to the data file or external system and set the flip-flop $FF_{10}$.

The true output terminal of the flip-flop $FF_{10}$ energizes the error indicator 91. A line 102 conducts the pulse transmitted by the gate 100 to other parts of the file storage and control unit 12 (FIG. 3) to terminate the transfer operation. The flip-flop $FF_{10}$ is reset by momentarily closing a switch 103 through the keyboard unit 13 (FIG. 1). In order that the transfer operation not be reinitiated until the flip-flop $FF_{10}$ has been reset, the true output terminal of that flip-flop may be connected to other parts of the file and storage control unit 12 by a line 104 to inhibit reinitiation of a transfer operation. In either case, any reinitiated transfer operation will again be terminated unless the operator has reexamined the page or line he wishes to transfer and has completed all of the fields of the message format by substituting appropriate characters for all of the control symbols being displayed.

It should be noted that transfer of data from the cyclic display storage unit 11 (FIG. 1) to the file storage and control unit 12 does not erase the data being transferred from the display storage unit 11. The data being displayed is erased only by either transferring new data from the file storage and control unit 12 to the display storage unit 11, or by clearing the display storage unit 11 through the keyboard unit 13 and the file storage and control unit 12. Accordingly, an unsuccessful attempt to transfer data does not alter the data being displayed. When the fields have been completed and a transfer operation has been reinitiated, the transfer of data to the output buffer 90 is reinitiated starting with the first character of the page or line being transferred. In that manner, data cannot be lost by an unsuccessful transfer operation.

We claim:

1. A data storage and display system comprising:

a display storage unit for storing display information representative of a data format and including at least one control symbol defining a character type;

means responsive to said information stored in said display storage unit for producing a visual representation thereof including said control symbol;

means for enabling an operator to selectively identify any-one of a plurality of characters, including characters of different types;

comparing means for indicating whether said identified character is of the type defined by said control symbol; and means responsive to said comparing means indicating said identified character is of the type defined by said control symbol for storing information in said display storage unit representative of said selectively identified character in place of said information representative of said control symbol.

2. A data storage and display system as defined in claim 1 including:

error indicating means; and means responsive to said comparing means indicating that said identified character is not of the type defined by said control symbol for energizing said error indicating means.

3. A data storage and display system comprising:

a display storage unit for storing display information representative of a data format and comprised of at least one control symbol defining a character type;

means responsive to said information stored in said display storage unit for producing a visual representative thereof including said control symbol;

means for enabling an operator to select an input character to be substituted for said control symbol;

comparing means for indicating whether said selected character is of the type defined by said control symbol;

a file storage unit for storing information including operator actuatable transfer initiating means for transferring thereto data from said display unit;

transfer means responsive to the actuation of said transfer initiation, means for transferring said display information from said display storage unit to said file storage unit; and means responsive to said display storage unit storing a control symbol for terminating operation of said transfer means.

4. A data storage and display system comprising:

a display storage unit for storing display information representative of a data format and comprised of at least one control symbol defining a character type;

means responsive to said information stored in said display storage unit for producing a visual representation thereof including said control symbol;

means for enabling an operator to select an input character to be substituted for said control symbol;

comparing means for indicating whether said selected character is of the type defined by said control symbol;

a control unit for transmission of said display information to an external system including operator actuatable transfer initiating means;

transfer means responsive to the actuation of said transfer initiating means for transferring said display information from said display storage unit to said control unit for transmission to said external unit; and means responsive to said display storage unit storing a control symbol for terminating operation of said transfer means.

5. In a data display system employing a CRT unit which displays a plurality of characters, each in a dot matrix consisting of a plurality of columns, each column having a series of dot positions at which a beam of said CRT unit is unblanked in response to selected binary digits of a video code serially read from a storage unit to display a character as the plurality of video codes are cyclically read for display, and which automatically blanks said CRT beam during the beam retrace between successive strokes, said beam retrace blanking taking place while a bit storage position is read in said storage unit in order to maintain synchronous operation between said CRT unit and said storage display unit, apparatus for displaying a message format with at least one field to be completed by entry of at least one character of a specified type in a designated position, said position being designated by a control symbol identifying the type of character to be entered, the video code of said control symbol including in predetermined retrace bit positions a control binary code specifying the type of character to be entered, and for enabling an operator to enter characters in positions designated by control symbols, comprising:

means for marking a given character position for selective entry of a new character;

means actuatable by an operator for selecting a character to be entered in a given position in which a given control symbol is displayed;

means responsive to said marking means and to said operator actuatable means for comparing the type of character selected for entry with the type of character specified by the control binary code of said given control symbol;

entry means responsive to said marking means for entering the selected character in said message format at the position designated by substituting a video code for the selected character in said display storage unit in place of the video code stored therein for said given control symbol; and means responsive to said comparing means for inhibiting said entry means from entering the selected character if it is not of the type specified by said control binary code.

6. In a data display system, apparatus as defined in claim 5 including means responsive to said comparing means for indicating an error when said character selected is not of the type specified by the control character code of said given control symbol.

7. In a data display system, apparatus as defined in claim 6 including means for advancing said marking means to mark the next character position for selective entry of a new character; and means responsive to said error indicating means for inhibiting said advancing means from advancing said marking means.

8. In a data display system, apparatus as defined in claim 7 wherein said error indicating means includes a flip-flop set by said comparing means when the selected character is not of the type specified by said control character code, and an operator actuatable means for resetting said flip-flop.

9. In a data display system as defined in claim 5 wherein said system includes a file storage unit for storing information;

operator actuatable transfer initiating means;

transfer means responsive to the actuation of said transfer initiating means for transferring said display information from said display storage unit to said file storage unit; and means for monitoring display information being transferred to said file storage unit and for terminating operation of said transfer means upon detecting a video code of a character being transferred having a control binary code.

10. In a data display system, apparatus as defined in claim 9 including means responsive to said monitoring means for indicating when said operation has been terminated.

11. In a data display system, apparatus as defined in claim 10 wherein said indicating means includes a flip-flop set by said monitoring means when said operation has been terminated, and an operator actuatable means for resetting said flip-flop.

12. In a data display system apparatus as defined in claim 5 wherein said system includes a control unit for transmission of said display information to an external system;

operator actuatable transfer initiating means;

transfer means responsive to the actuation of said transfer initiating means for transferring said display storage unit to said control unit for transmission to said external unit; and means for monitoring display information being transferred to said control unit and for terminating operation of said transfer means upon detecting a video code of a character being transferred having a control binary code.

13. In a data display system apparatus as defined in claim 12 including means responsive to said monitoring means for indicating when said operation has been terminated.

14. In a data display system apparatus as defined in claim 13 wherein said indicating means includes a flip-flop set by said monitoring means when said operation has been terminated, and an operator actuatable means for resetting said flip-flop.